(12) United States Patent
Monahan

(10) Patent No.: US 7,388,589 B2
(45) Date of Patent: *Jun. 17, 2008

(54) SYSTEM FOR AND METHOD OF PERFORMING AN OPACITY CALCULATION IN A 3D GRAPHICS SYSTEM

(75) Inventor: Charles Monahan, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/263,442

(22) Filed: Oct. 31, 2005

(65) Prior Publication Data

US 2006/0050078 A1    Mar. 9, 2006

Related U.S. Application Data

(63) Continuation of application No. 10/184,397, filed on Jun. 27, 2002, now Pat. No. 6,977,658.

(51) Int. Cl.
G09G 5/00    (2006.01)

(52) U.S. Cl. .............. 345/581; 345/421; 345/422; 345/592

(58) Field of Classification Search .......... 345/592
See application file for complete search history.

(56) References Cited

U.S. PATENT DOCUMENTS

| 4,982,343 | A | * | 1/1991 | Hourvitz et al. ........... 345/592 |
| 5,926,181 | A |   | 7/1999 | Lewis et al. |
| 5,963,210 | A |   | 10/1999 | Lewis et al. |
| 6,271,848 | B1 |   | 8/2001 | Yasui |
| 6,614,444 | B1 | * | 9/2003 | Duluk et al. ............. 345/581 |
| 6,614,447 | B1 | * | 9/2003 | Bhatia et al. ............. 345/592 |
| 2002/0145616 | A1 | * | 10/2002 | Doan ....................... 345/629 |

OTHER PUBLICATIONS

U.S. Appl. No. 10/184,397, filed Jan. 1, 2004, Monahan.

European Search Report on EP 03 01 4724 dated Jul. 26, 2006.

* cited by examiner

Primary Examiner—Kee M. Tung
Assistant Examiner—Antonio A Caschera
(74) Attorney, Agent, or Firm—McAndrews, Held & Malloy, Ltd.

(57) ABSTRACT

A system, device and method are disclosed for predicting the opacity of primitives used to produce an image using one or more equations, prior to producing an image. More specifically, the present invention relates to a 3D device adapted to produce an image comprising an opacity estimate predictor adapted to predict opacity of at least one primitive using at least one first equation and further adapted to reject the primitive if the predicted opacity is equal to a minimum value.

17 Claims, 4 Drawing Sheets

SYSTEM FOR AND METHOD OF PERFORMING AN OPACITY CALCULATION IN A 3D GRAPHICS SYSTEM

CROSS-REFERENCE TO RELATED APPLICATIONS

This patent application is a Continuation of U.S. patent application Ser. No. 10/184,397 entitled "SYSTEM FOR AND METHOD OF PERFORMING AN OPACITY CALCULATION IN A 3D GRAPHICS SYSTEM", filed Jun. 27, 2002 now U.S. Pat. No. 6,977,658, the complete subject matter of which is hereby incorporated herein by reference, in its entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

The present invention relates to estimating opacity. More specifically, the present invention relates to a system and method for opacity calculation, prediction or estimation.

Currently three-dimensional processors (alternatively referred to as "3D processors"), render realistic two-dimensional images from a list of three-dimensional objects. These three dimensional objects (alternatively referred to as "data or primitives") may consist of, for example, points, lines, triangles, and rectangles. These primitives may be combined to produce more complex objects or images. Some known prior art 3D processors write and store each of the primitives in an external memory, thus requiring a large external memory. Furthermore, writing such primitives to and reading them from an external memory requires using a large amount of bandwidth to transmit such data.

Images containing multiple primitives invariably have primitives that overlap. Each primitive has depth, translucency and color, among other attributes. The depth identifies which primitive is in front, while the translucency indicates whether the rear-most primitive is visible through the front-most primitive. A non-translucent primitive (i.e., an opaque primitive) blocks the primitives lying behind it. Therefore, identifying opaque primitives permits the removal of blocked or eclipsed primitives. In other words, the primitives lying behind the opaque primitives need not be displayed. However, translucency/opacity is not a simple, single parameter that is easy to identify but is a combination of many parameters.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a device, system and method for predicting the opacity of primitives used to produce an image, without actually computing or calculating such opacity. Predicting the output of the process reduces the number of primitives that must be computed or looked up in an external memory prior to blending the primitives.

One embodiment of the present invention relates to a hardware method or device for computing opacity. This invention uses a simple encoding for alpha and color attributes of the primitives. The encoding distinguishes extreme values (fully opaque and fully transparent) as well as intermediate (non-extreme) and unknown values. This enables the system and device to model complements of the alpha and color attributes while simplifying the models of a Texture ALU. Modeling the Texture ALU behavior may prevent excluding Texture Blend modes and maintaining the interaction of alpha and color values through multiple Texture ALU's. The result of these blends may then be evaluated with one or more attributes to determine a primitive's opacity.

One embodiment of the present invention relates to a method for producing an image. In this embodiment the method comprises predicting the opacity of data used to produce the image and dividing the data into at least two groups, based at least in part on the predicted opacity of the data. The method further comprises blending at least some, if not all, of the data in at least one of the groups, producing the image.

One embodiment of the present invention relates to a 3D device. In this embodiment, the 3D device is adapted to produce an image and comprises an opacity estimate predictor adapted to predict opacity of at least one primitive using at least one first equation derived from at least one second equation used to compute opacity.

Another embodiment relates to a 3D core for producing an image using at least two primitives. In this embodiment, the 3D core comprises an opacity estimate predictor, a register and a texture module. The opacity estimate predictor is adapted to predict opacity of the primitives using at least one first formula and reject at least one of the primitives if the predicted opacity is equal to a minimum value. The register device is adapted to store a list of the non-rejected primitives. The texture device is adapted to compute the opacity of the non-rejected primitives using at least one second formula.

Another embodiment of the present invention relates to a method for producing an image. In this embodiment, the method comprises predicting opacity of data used to produce the image using at least one first equation and rejecting select data based at least in part on the predicted opacity, forming a group of non-rejected data. The method further comprises computing opacity for the group using at least one second equation and blending the group, forming the image.

Yet another embodiment of the present invention relates to a method of computing opacity of a plurality of primitives used to produce an image. This embodiment comprises predicting an opacity value of the primitives using a first equation and rejecting at least one of the primitives based at least in part on the predicted opacity value. A primitive list of the first non-rejected primitives is generated and at least one of the primitives from the list is identified for at least one display line of the image. The first non-rejected primitives are ordered and at least one of the first non-rejected primitives is rejected based at least partially on the predicted opacity value forming second-non-rejected primitives. The opacity of the second non-rejected primitives is computed using a second equation and all the second non-rejected primitives are blended, producing the image.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

One embodiment of the present invention relates to predicting at least the opaque and translucent primitives used to produce an image without actually calculating or computing such opacity or using a look-up table. In order to increase the quality of 3D images, each primitive has an increasing number of attributes. The attributes of primary interest include Alpha Blend, Logic Operations, multiple color sets, multiple textures, and blending of the textures and color sets.

Figure 1:
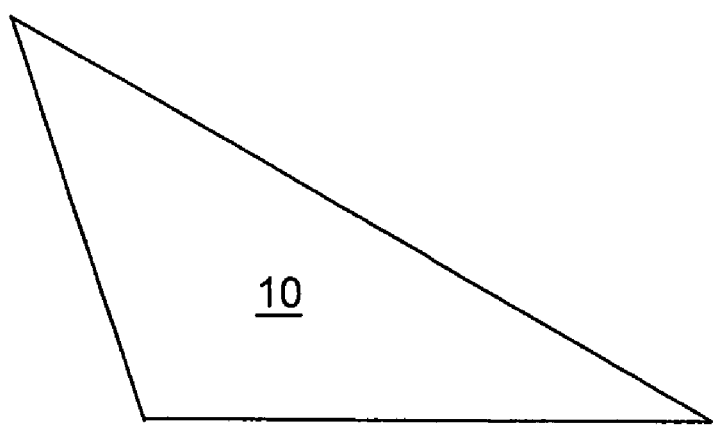
FIG. 1 illustrates one example of a primitive having a plurality of attributes.

FIG. 1 illustrates one example of a primitive 10, where each vertex of the primitive 10 has designate X, Y and Z values. In this embodiment, each primitive may have a number of attributes, including multiple color sets, multiple textures and an alpha value. In the illustrated embodiment, the values R, G and B represent the color attributes red, green and blue respectively. The value A represents alpha and the value T represents the texture attribute. While only the attributes R, G, B, A and T are illustrated, other attributes are contemplated.

In this embodiment, the Alpha Blend unit refers to a mathematical unit that blends two overlaying primitives. Typically, a primitive is blended by a positive fractional value generally referred to as "alpha". Alpha has no visual color; rather it represents a fraction available for blending. It is contemplated that the Alpha Blend unit does not have to use the alpha value, it is only one of many options that may be selected for an application. Alternatively, the Alpha Blend unit may base the blend on the previous or current primitive's color or alpha, the inverse of any of these, a constant or some other factor. These and additional alpha-blend options make determining opacity complex, since opacity may be derived from a variety of parameters.

Predicting the alpha or color value of a primitive is complex. Therefore, in this embodiment, primitives that base their opacity on the alpha or color of the proceeding primitives are generally considered semi-opaque and may be ignored. Alternatively, alpha blends may be replaced with logical operations that blend primitives based on bit-wise logical operations. While both the set of logical operations and alpha blend commands contain one setting that force a primitive to be opaque regardless of alpha or color, most current operations defer the opacity test to either the color or alpha value of the primitive.

The color and alpha of a primitive is generally a combination of multiple color sets and textures as illustrated in FIG. 1. Each primitive may have multiple color sets (containing both a colors and an alpha value) associated therewith. Such color sets may be constant, change linearly, or change logarithmically over the surface of the primitive. Textures are additionally available to describe non-linear patterns in either the color channel, the alpha channel, or both. For example, an image of an explosion could have gaps of opacity and color shifts that may not be described as a linear function. Whereas the color sets may be described in a few parameters assigned to each primitive, the complexity and detail of textures require that they be referred to indirectly through texture file addresses.

Determining the color and alpha values for specific points of a texture is a complex process, and generalizing the color or alpha values for the entire surface of a primitive is extremely complex. One attribute of textures is that they often specify their alpha as completely opaque for the entire primitive in order to compress texture information. Given these multiple color sets and textures, it is contemplated that one embodiment of the present invention may use software or a hardware method (a "Texture ALU" as provided below), or some combination to combine and blend these values into a single pattern over the surface of the primitive. In one embodiment, the primitive instructs the software or hardware method using a "Texture Blend" command for example to combine a subset of the color sets and textures. The combinations may be added, subtracted, or blended (using either the alpha or color as the weight).

It is contemplated that determining opacity potentially requires knowing the alpha or color values of the primitive. The alpha and color are the product of a Texture ALU, which requires knowledge of both the type of blends being performed and the alpha and colors which are used as arguments. While predetermining alpha values for textures is complex, it is feasible for some cases. In one embodiment, software is used to combine these parameters into a single opacity value of either fully opaque, fully translucent, unknown or partially opaque. Using software exploits the fact that many of the Alpha Blend, Logic Operation, and Texture Blend modes are predefined. This enables a lookup table approach where only the necessary input attributes are investigated as a result of the specific blend option.

It should be appreciated that a total software solution is not without its limitations. First, additional choices in the Alpha Blend, Logic Operation, and Texture Blends may cause the lookup tables to increase in size. Secondly, the number of colors and textures may require using additional Texture ALU's whose outputs may feed other Texture ALU's. These two issues combine in making a software solution more complex.

Figure 2:
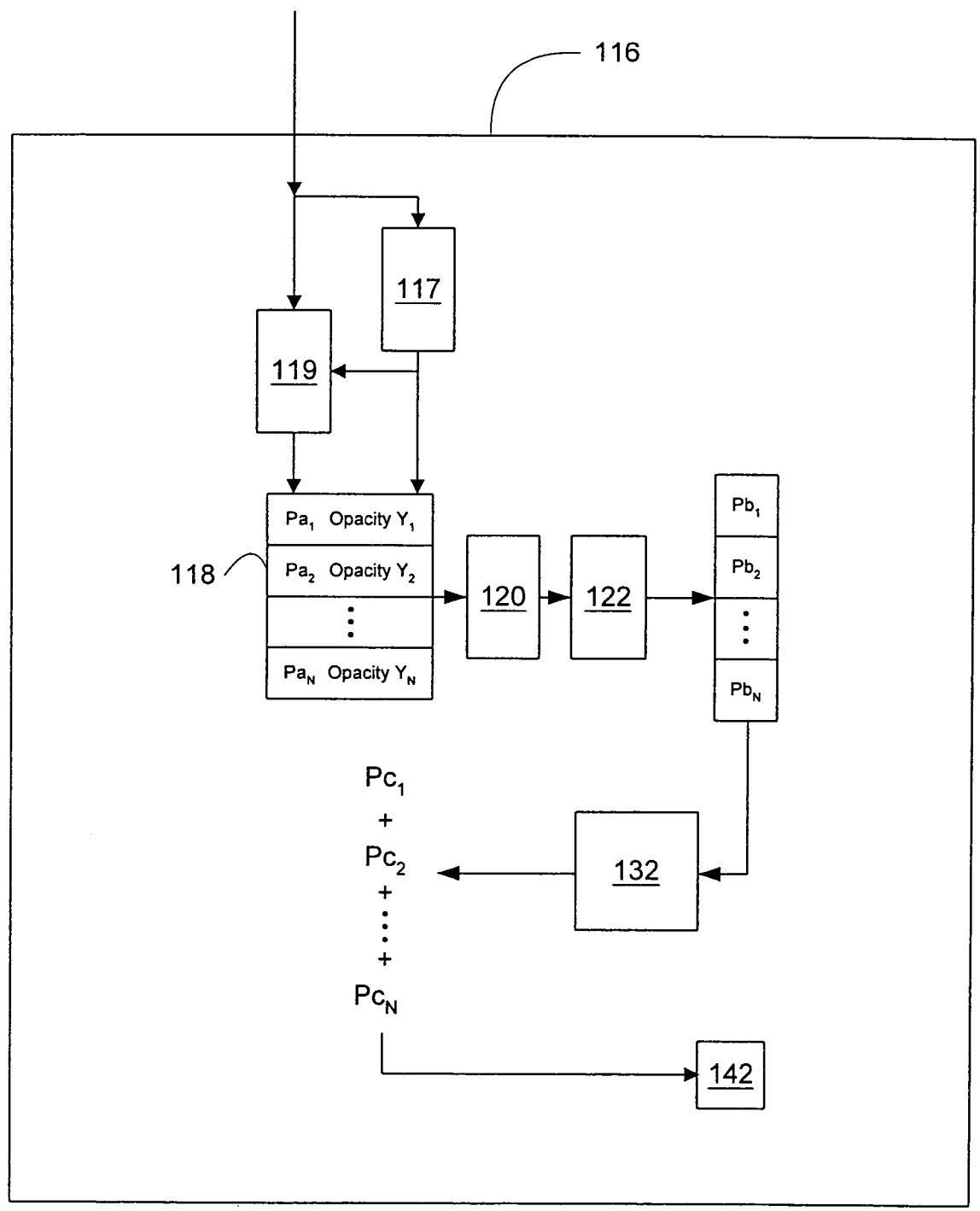
FIG. 2 illustrates one embodiment of a block diagram of a 3D core or device in accordance with the present invention.

FIG. 2 illustrates one embodiment of a block diagram of a 3D device or core, generally designated 116, in accordance with the present invention. It is contemplated that, in one embodiment, the 3D core 116 may be part of a larger system including a CPU or controller and a memory device coupled to and communicating with the 3D Core 116. It is further contemplated that the 3D core 116 may be formed on one chip or a plurality of chips, incorporated into a larger single device or a plurality of devices.

In the illustrated embodiment, one or more primitives (primitives $Pa_1$-$Pa_N$ are illustrated,) are provided to, and received by, the 3D core 116. In the illustrated embodiment, each primitive has at least one associated texture and/or Alpha.

In this embodiment, the 3D core 116 comprises at least an opacity estimate predictor module 117 and a rejector module 119. It is contemplated that the modules may be hardware, software or some combination. In one embodiment, it is contemplated that either the opacity estimate predictor module 117 or the rejector module 119 is adapted to receive the primitives $Pa_1$-$Pa_N$. In other words, both modules are adapted to receive all, some or none of the primitives. It is also contemplated that, in one embodiment, the opacity estimate predictor module 117 and the rejector module 119 may be combined into a single module (not shown).

In the present invention it is contemplated that the opacity estimate predictor module 117 is implemented and adapted to predict or estimate the opacity of the one or more primitives without actually calculating such opacity. In this embodiment, the opacity estimate predictor module 117 predicts opacity of the primitives according to a set of instructions including equations that that are based on or derived from the following opacity calculation equation or formula:

$$((A*B)+/-(C*D)+/-E)<<S$$

It is contemplated that the arguments A through E are fractional numbers ranging between 0 and 1.0. It is further contemplated that the arguments A through E may also be a constant (e.g., 0, 0.5, or 1.0), the color or alpha value of either a texture, color set, or the result of a previous operation. Additionally, the complement (1.0−x) may be taken of any of the eligible values for arguments A through E. In one embodiment, the values are encoded to permit a simple bit-wise inversion to perform the operation of complementing. Further, the variable S shifts the resulting sum (represented in the equation by the symbol <<). This has the effect of multiplying the sum by 1, 2, 4, etc. Since the post-shifted value must remain in the range of 0 to 1.0, the result must be clamped to either the minimal or maximal value in the case of under or over flow as produced below.

The encoding for the various values are two-bit Boolean values of: 0b11 (maximal value), 0b00 (minimal value), 0b01 and 0b10 (unknown or other value). The benefit of this encoding is that it traces the extreme values of 1.0 and 0, which often account for full opacity or translucency. The lumping of non-extreme (intermediate) values with the unknown values into the encoding may inhibit the precision of the results of the estimate opacity estimate predictor module 117. Accordingly, the addition and subtraction of intermediate values that may result in a maximum or minimum value are ignored in this exemplary embodiment.

Given an encoding, each color and alpha pair of each color set and texture may be set accordingly. While selecting the inputs for the arguments A through E involves simple multiplexing and inversion (for complements), modeling the computation is a little more complex. As provided earlier, the encoding is designed to tract extreme values. Regardless, z prediction model may be reduced a first equation or formula which exploits the following axioms:

$$1.0*1.0=1.0$$

$$0.0*x=0.0$$

$$1.0+x=1.0 \text{ (when clamped)}$$

$$0.0-x=0.0 \text{ (when clamped)}$$

$$x-1.0=0.0 \text{ (when clamped)}$$

$$0.0<<n=0.0$$

$$1.0<<n=1.0 \text{ (when clamped)}$$

If these axioms are applied to one embodiment of the opacity calculation equation or formula set forth above, the following functions may result:

MIN value={[(A==0b00)|(B==0b00)] & [(SubCD)|(C==0b00)|(D==0b00)] & [(SubE)|(E==0b00)]}|{SubCD & (C==0b11) & (D==0b11) & [(SubE)|(E==0b00)|[(A==0b00) & (B==0b00)]]}|{SubE & (E==0b11) & [(SubCD)|[(C==0b00) & (D==0b00)]|[(A==0b00) & (B==0b00)]]}

MAX value={[(A==0b11) & (B==0b11)] & [(~SubCD)|(C==0b00)|(D==0b00)] & [(~SubE)|(E==0b00)]}|{(A==0b11) & (B==0b11) & (~SubCD) & (C==0b11) & (D==0b11)}|{(A==0b11) & (B==0b11) & (~SubE) & (E==0b11)}|{(~SubCD) & (C==0b11) & (D==0b11) & [(~SubE)|(E==0b00)]}|{(~SubCD) & (C==0b11) & (D==0b11) & (~SubE) & (E==0b11)}|{(~SubE) & (E==0b11) & [(~SubCD)|[(C==0b00)|[(D==0b00)]]}

The prediction module may result may be constructed from these Boolean results through concatenation, Result=Max, ~Min. Since the functions are disjoint, they can never both be true for the same set of inputs. For example, if MIN is true (i.e. the opacity value is equal to the MIN value), the result becomes 0b00 (zero because MAX failed and zero from the inverse of MIN). If MAX is true (i.e., the opacity value is equal to the MAX value), the result is 0b11. If neither function is true, the unknown result is encoded as 0b01.

The concise nature of these equations enables a more thorough analysis. Not only is the opacity prediction modeled using the opacity estimate predictor, but also the time to compute a result is relatively short (i.e., only a few clock cycles). It is contemplated that, in systems that require multiple clock cycles to process a primitive, the same hardware may be used to model the successive operations of multiple opacity estimate predictors 117. Additionally, the same hardware may compute the results of the alpha and color channels. This hardware savings is a result of the efficiency of the present invention.

FIG. 2 further illustrates that the 3D Core 116 comprises at least a register 118 (or buffer or other memory or storage device) adapted to store information or data (a primitive list including primitives $Pa_1$-$Pa_N$ having opacity values $Y_1$-$Y_N$ is illustrated, for example) internal to the 3D core 116. In one embodiment, information or data is written or communicated to the primitive list register 118 from either the opacity estimate predictor module 117, the rejector module 119 or both, so that the 3D core 116 doesn't have to retrieve information from an external global memory every time an image is being produced.

This embodiment of the 3D core 116 further comprises an X-loop & Y-loop or module 120 adapted to identify one or more primitives for a current pixel. The X— & Y-loop 120 is illustrated coupled to and communicating with at least the register 118, and is further adapted load X and Y primitives to determine one or more scan lines from a plurality of scan lines being worked on, as is disclosed in patent application Ser. No. 09/978,476 filed Oct. 16, 2001 (Docket No. BP-1574), which is incorporated herein by reference in its entirety.

Z-order module 122 is illustrated as being coupled to and communicating with the X-loop & Y-loop 120. In the present invention, the Z-order module 122 orders the primitives for the one or more relevant scan lines. In one embodiment, the Z-order module orders the primitives in terms of depth (i.e., from the background to the foreground of an image).

In the present invention, the 3D Core 116 parses the primitive list. In one embodiment, the 3D Core rejects at least one of the primitives in the primitive list based in part on the predicted opacity. More specifically, the core rejects all primitives behind the opaque primitives.

In one embodiment of the present invention, the 3D core 116 further comprises a Texture ALU 132 communicating with at least the Z-order device 122. The Texture ALU 132 is, in this embodiment, equation implemented and is adapted to merge a primitive set having multiple attributes into a primitive set having one set of attributes. More specifically, the Texture ALU 132 takes a plurality of primitives ($Pb_1$-$Pb_N$ are illustrated) having a plurality of attributes, and processes them according to one or more complex equations or algorithms provided below, to determine the computed opacity of such primitives. The Texture ALU 132 outputs a plurality of primitives ($Pc_1$-$Pc_N$) having one set of attributes. Ultimately, such primitives ($Pc_1$-$Pc_N$) are blended together, producing image 142.

In one embodiment, the Texture ALU 132 is a general ALU, which is configured to support a number of specified blending operations. It is contemplated that the Texture ALU 132 may support known architecture specifications (OpenGL™ or DirectX™ for example) where typically outline the set of operations to be supported. In this embodiment, the Texture ALU computes the opacity for the primitives using the opacity calculation equation or formula:

$$((A*B)+/-(C*D)+/-E)<<S$$

which is sufficient to support the set of Texture ALU operations. It is contemplated that the first or prediction formula or equation is based, at least in part, on the second equation, and that the first formula, the second formula, or both, may comprise one or more complex equations. It is further contemplated, as provided previously, that the arguments A through E are fractional numbers ranging between 0 and 1.0. It is further contemplated that the arguments A through E may also be a constant (e.g., 0, 0.5, or 1.0), the color or alpha value of either a texture, color set, or the result of a previous Texture ALU operation. Additionally, the complement (1.0-x) may be taken of any of the eligible values for arguments A through E. In one embodiment, the values are encoded to permit a simple bit-wise inversion to perform the operation of complementing. The variable S shifts the resulting sum. This has the effect of multiplying the sum by 1, 2, 4, etc.

The present invention, in one embodiment, divides the primitives into at least two groups based, at least in part, on the opacity of the primitives. In one embodiment of the present invention, the primitives are divided into translucent group (having a minimum opacity value) and non-translucent group (having a non-minimum opacity value) based, at least in part, on the predicted opacity. Subsequently, using the second formula, the primitives may be divided into three groups, for example a fully opaque group (having a MAX opacity value), a fully translucent group (having a MIN opacity value) and a non-extreme group (having an intermediate or un-known opacity value) based, at least in part, on such predicted opacity.

Figure 3:
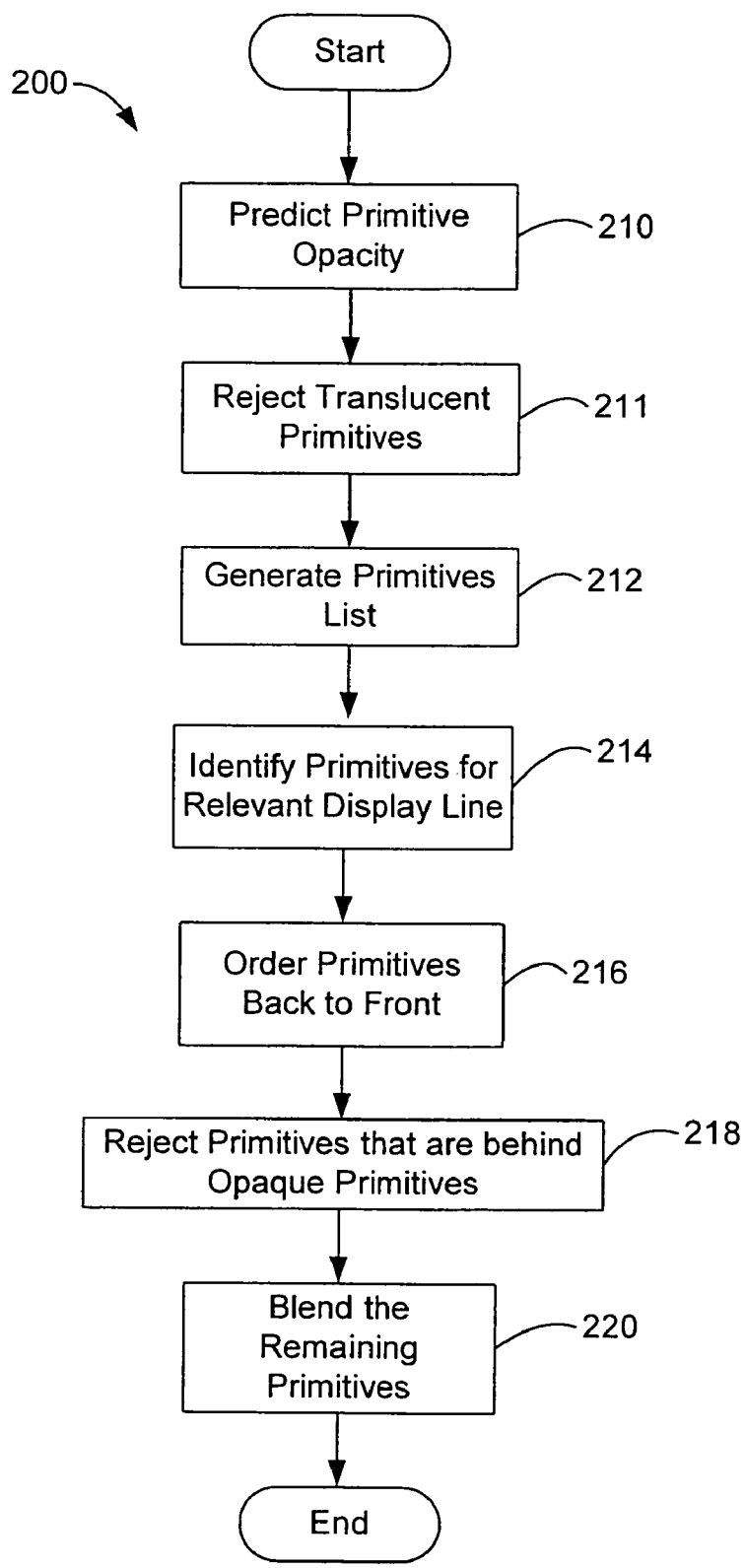
FIG. 3 illustrates one embodiment of a high level flow diagram for predicting autoopacity of data or primitives used to produce an image in accordance with the present invention.

FIG. 3 illustrates one embodiment of a high level flow diagram for predicting the output of a 3D process prior to producing the image by predicting autoopacity of the primitives used to produce the image in accordance with the present invention. Predicting the output of the process reduces or eliminates the number of primitives that must be looked up, in an external memory for example. This method, generally designated 200, predicts the opacity of at least one or more primitives as illustrated by block 210 using at least the first formula. The method rejects at least one, if not all, of the predicted translucent primitives as illustrated by block 211.

A primitive list is generated as illustrated by block 212. In one embodiment, this list may be stored in a device similar to the register 118 of FIG. 2. The method 200 further includes identifying at least one primitive for a current pixel. More specifically the method generally identifies all the primitives for at least one relevant display line as illustrated by block 214.

The primitives are ordered as illustrated in block 216. In one embodiment, the primitives are ordered from the back to front of the image using a Z-order device similar to that discussed previously.

In one embodiment of the present invention, at least one of the primitives is rejected or parsed, and at least one of the remaining primitives is blended as illustrated by blocks 218 and 220. More specifically, the present method rejects at least one, some or all of the primitives behind the opaque primitives, based in part on the predicted opacity of the opaque primitives. The opacity is computed for the remaining primitives, which are blended ultimately producing the image.

Figure 4:
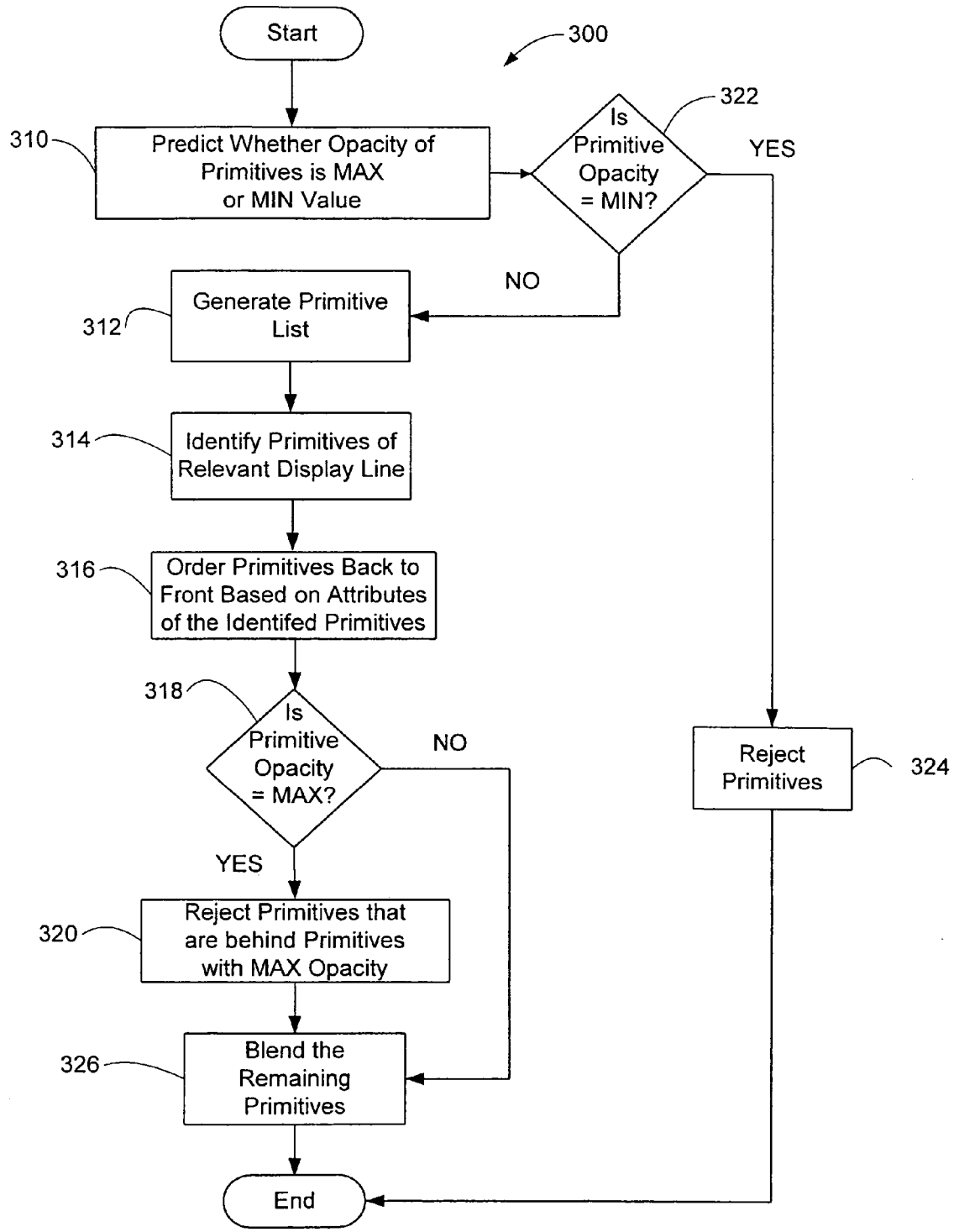
FIG. 4 illustrates one embodiment of a detailed flow diagram for predicting autoopacity of data or primitives used to produce an image in accordance with the present invention.

FIG. 4 illustrates one embodiment of a detailed flow diagram for estimating or predicting autoopacity of primitives, used in predicting the output of a 3D process prior to producing the image. In this embodiment, the method, generally designated 300, predicts the opacity of at least one or more primitives as illustrated by block 310 using the first formula. More specifically, the present invention predicts whether the opacity value of the primitives is a MAX, MIN or some other opacity value. The present invention determines if the opacity value of the at least one primitive is equal to the MIN opacity value as illustrated by diamond 322. If the opacity value is equal to the MIN opacity value (i.e., those primitives are fully translucent), those primitives are rejected as illustrated by block 324.

If the opacity value is not equal to the MIN value, a primitive list is generated as illustrated by block 312. The method 300 further includes identifying at least one, but generally all the primitives for at least one relevant display line as illustrated by block 314.

The identified primitives are then ordered as illustrated in block 316. In one embodiment, the primitives are ordered from back to front based on at least one or more of the attributes of the identified primitives. The method 300 determines if the opacity value of the primitive is equal to the MAX opacity value as illustrated by diamond 318. If the opacity value is equal to the MAX opacity value, at least one, some or all of the primitives behind the primitives having a MAX opacity value are rejected as illustrated by block 320. At least one, but generally all of the non-rejected primitives are blended as illustrated by block 326.

If the opacity value of the at least one primitive is not equal to the MAX opacity value, the primitives are not rejected (i.e., non-rejected). At least one, but generally all of the non-rejected primitives are blended as illustrated by block 326, producing the image.

Many modifications and variations of the present invention are possible in light of the above teachings. Thus, it is to be understood that, within the scope of the appended claims, the invention may be practiced otherwise than as described hereinabove.

The invention claimed is:

1. A 3D processor for producing an image using at least two primitives comprising:
    an opacity estimate predictor operable to estimate an opacity of each primitive as one of a minimum opacity value and a maximum opacity value using at least one first formula and operable to reject a primitive if its estimated opacity is equal to the minimum value;
    a register operable to store a list of non-rejected primitives; and
    a texture device operable to compute the opacity of the non-rejected primitives using at least one second formula.

2. The 3D processor of claim 1 wherein said first formula is derived using said second formula.

3. The 3D processor of claim 1 further adapted to parse said list of non-rejected primitives.

4. The 3D processor of claim 3 further adapted to reject any non-rejected primitives that are behind any non-rejected primitives having an estimated opacity equal to the maximum opacity value.

5. The 3D processor of claim 1, further comprising an X-loop and Y-loop communicating with at least said register and adapted to determine at least one relevant scan line.

6. The 3D processor of claim 5, further comprising a Z-order device communicating with at least the X-loop and Y-loop and adapted to order the primitives.

7. A method for producing an image, the method comprising:
    predicting opacity of primitives represented by data used to produce the image, said predicting comprising using at least one first equation to predict an opacity of each primitive to be one of a minimum opacity value and a maximum opacity value;
    rejecting select primitives based at least in part on the predicted opacity, forming a group of non-rejected primitives;
    computing opacity for said group using at least one second equation; and
    blending said group, forming the image.

8. The method of claim 7, wherein forming said group comprises rejecting at least one of said primitives having a predicted opacity equal to the minimum opacity value.

9. The method of claim 7, wherein forming said group comprises rejecting at least one of said primitives that is behind a primitive having a predicted opacity equal to the maximum opacity value.

10. The method of claim 7, further comprising ordering said group from a back to a front of the image.

11. The method of claim 7, further comprising generating a primitives list.

12. The method of claim 7, further comprising identifying primitives for at least one display line of the image.

13. The method of claim 7, wherein said second equation is based on said first equation.

14. The method of claim 7, wherein said at least one first equation comprises a plurality of equations.

15. The method of claim 7, wherein said at least one second equation comprises a plurality of equations.

16. A method of computing opacity of a plurality of primitives used to produce an image, the method comprising:
    predicting an opacity value of each primitives to be one of a minimum opacity value and a maximum opacity value using at least one first equation;
    rejecting a primitive if its predicted opacity is equal to the minimum opacity value;
    generating a primitive list of first non-rejected primitives;
    identifying at least one of the primitives from said list for at least one display line of the image;
    ordering said first non-rejected primitives;
    rejecting any first non-rejected primitives that are behind any non-rejected primitives having a predicted opacity equal to the maximum opacity value, thereby forming second non-rejected primitives;
    computing opacity for said second non-rejected primitives using at least one second equation; and
    blending all said second non-rejected primitives, producing the image.

17. The method of claim 16 wherein said first formula is derived using said second formula.

* * * * *